US012567438B2

(12) United States Patent
Le et al.

(10) Patent No.: US 12,567,438 B2
(45) Date of Patent: Mar. 3, 2026

(54) MAGNETIC HEADS HAVING LOW MAGNETIC COERCIVITY (Hc) AND HIGH SATURATED MAGNETIC FLUX DENSITY (Bs) IN FERROMAGNETIC (FM) LAYER(S) OR SHIELD(S) WITH MINIMIZED SATURATION

(71) Applicant: Western Digital Technologies, Inc., San Jose, CA (US)

(72) Inventors: Quang Le, San Jose, CA (US); Brian R. York, San Jose, CA (US); Xiaoyong Liu, San Jose, CA (US); Jinming Liu, San Jose, CA (US); Son T. Le, San Jose, CA (US); Michael A. Gribelyuk, San Jose, CA (US); Susumu Okamura, San Jose, CA (US); Hisashi Takano, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 180 days.

(21) Appl. No.: 18/397,007

(22) Filed: Dec. 27, 2023

(65) Prior Publication Data

US 2025/0218456 A1 Jul. 3, 2025

(51) Int. Cl.
| | |
|---|---|
| *G11B 5/31* | (2006.01) |
| *G11B 5/127* | (2006.01) |
| *G11B 5/235* | (2006.01) |
| *G11B 5/39* | (2006.01) |
| *G11B 5/00* | (2006.01) |

(52) U.S. Cl.
CPC ............ *G11B 5/1278* (2013.01); *G11B 5/235* (2013.01); *G11B 5/314* (2013.01); *G11B 5/3146* (2013.01); *G11B 5/315* (2013.01); *G11B 5/3909* (2013.01); *G11B 5/3912* (2013.01); *G11B 2005/0024* (2013.01)

(58) Field of Classification Search
None
See application file for complete search history.

(56) References Cited

U.S. PATENT DOCUMENTS

| | | | |
|---|---|---|---|
| 10,762,917 B1 * | 9/2020 | Le et al. .............. | G11B 5/1278 |
| 11,532,323 B1 * | 12/2022 | Le et al. ................ | G11B 5/314 |
| 2014/0300996 A1 * | 10/2014 | Murakami et al. .. | G11B 5/3912 360/246.1 |
| 2023/0047223 A1 * | 2/2023 | Le et al. ................ | G11B 5/235 |
| 2023/0306993 A1 * | 9/2023 | Le et al. ................ | G11B 5/39 |
| 2024/0005951 A1 * | 1/2024 | Shi et al. ............. | G11B 5/3912 |

* cited by examiner

*Primary Examiner* — Craig A. Renner
(74) *Attorney, Agent, or Firm* — Patterson + Sheridan, LLP

(57) ABSTRACT

Magnetic moments can be increased in hard disk drive (HDD) shields and ferromagnetic layers to minimize magnetic saturation while still maintaining low magnetic coercivity (Hc) and high saturated magnetic flux (Bs). A textured layer can be used to induce nucleation and growth of an interfacial nature such that body centered cubic (BCC) ferromagnetic materials with high Bs and low Hc are obtained while also increasing the magnetic moment. The textured layer will cause the ferromagnetic material to grow with low Hc regardless of the crystallographic orientation.

20 Claims, 7 Drawing Sheets

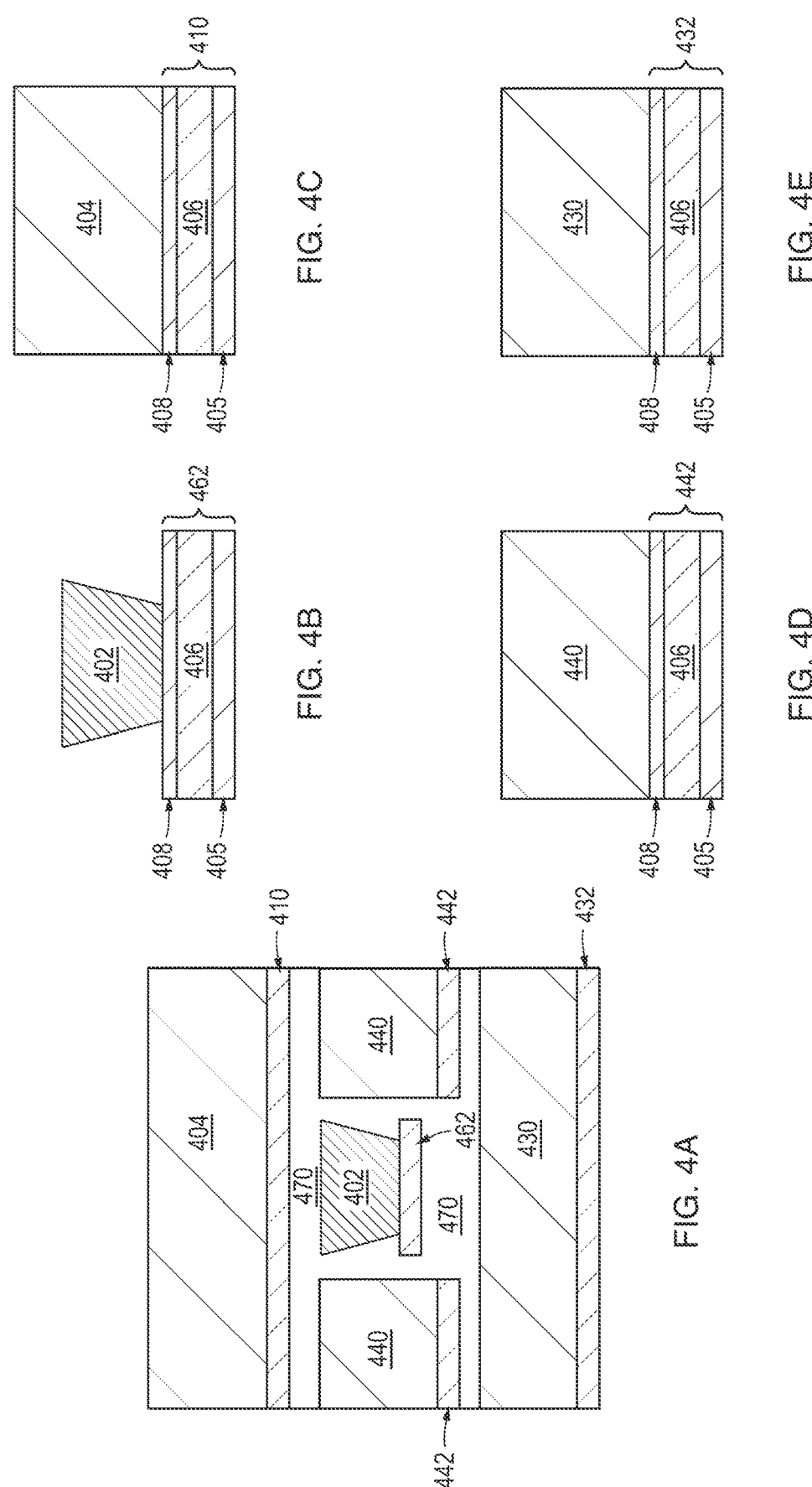

MAGNETIC HEADS HAVING LOW MAGNETIC COERCIVITY (Hc) AND HIGH SATURATED MAGNETIC FLUX DENSITY (Bs) IN FERROMAGNETIC (FM) LAYER(S) OR SHIELD(S) WITH MINIMIZED SATURATION

BACKGROUND OF THE DISCLOSURE

Field of the Disclosure

Embodiments of the present disclosure generally relate to magnetic heads having low magnetic coercivity (Hc) and high saturated magnetic flux density (Bs) in ferromagnetic layers or ferromagnetic shields.

Description of the Related Art

The heart of the functioning and capability of a computer is the storing and writing of data to a data storage device, such as a magnetic media drive (e.g., hard disk drive (HDD)). The HDD has a head comprising a reader (e.g., read head) and a writer (e.g., write head) that each has shields that capture unintended stray fields from adjacent bit/track, such as in the read head, or improve field gradient, such as in the write head. For the shields to be effective, the shields have high saturated magnetic flux (Bs)

Over the past few years, various magnetic recording methods have been studied to improve the areal density of a magnetic media device. Magnetic heads in HDDs can have a significant effect on the overall performance and reliability of the recording device. Magnetic heads may be designed to achieve specific advantages, such as improved performance.

One example design involves shields having high Bs and low magnetic coercivity (Hc). High Bs is beneficial in shields to achieve more accurate reading or writing of data. Low Hc, on the other hand, can lead to earlier/easier magnetic saturation due to low magnetic moments, which may be undesirable. As such, high Bs and low Hc heads are not utilized. Low Hc would be beneficial if the magnetic saturation issue could be resolved.

Therefore, there is a need in the art for an improved magnetic head.

SUMMARY OF THE DISCLOSURE

Magnetic moments can be increased in hard disk drive (HDD) shields and ferromagnetic layers to minimize magnetic saturation while still maintaining low magnetic coercivity (Hc) and high saturated magnetic flux (Bs). A textured layer can be used to induce nucleation and growth of an interfacial nature such that body centered cubic (BCC) ferromagnetic materials with high Bs and low Hc are obtained. The textured layer will cause the ferromagnetic material to grow with low Hc regardless of the crystallographic orientation.

In one embodiment, a head for a magnetic storage device comprises: a ferromagnetic layer or a shield comprising a ferromagnetic material, wherein the ferromagnetic layer or ferromagnetic material has a low magnetic coercivity (Hc) of below 20 Oe and a high saturated magnetic flux (Bs); and one or more of: a texture enabling structure, wherein the texture enabling structure comprises: an amorphous layer for disrupting underlying crystal seeding effects; and a (100) orientation enabling layer disposed on the amorphous layer; and a texture transfer layer configured to transfer a (100) orientation to a layer disposed thereon, wherein the ferromagnetic layer or the shield is over the one or more of the texture enabling structure and the texture transfer layer.

In another embodiment, a magnetic write head comprises: a main pole; a trailing shield; a leading shield; a side shield; and one or more texture enabling structures, wherein one or more of the main pole, the trailing shield, the leading shield, and the side shield is disposed on a corresponding texture enabling structure, wherein the texture enabling structure includes a (100) orientation enabling layer disposed on an amorphous layer, the (100) orientation enabling layer comprising RuAl or CrMo.

In another embodiment, a magnetic write head comprises: a main pole; a trailing shield; a spin orbit torque (SOT) layer disposed between the main pole and the trailing shield; a texture enabling structure disposed between the main pole and the SOT layer, wherein the spin orbit torque (SOT) layer is disposed on the texture enabling structure; and a texture transfer structure disposed between the SOT layer and the trailing shield.

In another embodiment, a magnetic read head comprises: a lower shield; an upper shield; a ferromagnetic layer disposed between the lower shield and the upper shield; and at least one texture transfer structure, wherein one or more of the ferromagnetic layer and the upper shield is disposed on a corresponding texture transfer structure, wherein the texture transfer structure includes: BCC metals; NiAl, IrAl, CoAl, RhAl, or RuAl; or a multilayer structure including: a trilayer structure comprising: a first layer comprising NiAl, IrAl, CoAl, RhAl, or RuAl; a second layer comprising MgO; and a third layer comprising NiAl, IrAl, CoAl, RhAl, or RuAl; or a bilayer structure comprising: a first layer comprising NiAl; and a second layer comprising RuAl.

In another embodiment, a magnetic read head comprises: a lower shield; an upper shield; a first ferromagnetic layer disposed between the lower shield and the upper shield; a second ferromagnetic layer disposed between the first ferromagnetic layer and the upper shield; and at least one texture structure, wherein one or more of the first ferromagnetic layer, the second ferromagnetic layer, and the upper shield is disposed on a corresponding texture structure, wherein the at least one texture structure includes: a texture enabling structure; or a texture transfer structure; or both a texture enabling structure and a texture transfer structure.

In another embodiment, a magnetic read head comprises: a lower shield; an upper shield; a first texture transfer structure; a first spin orbit torque (SOT) layer disposed on the first texture transfer structure; and a second SOT layer disposed between the first SOT layer and the upper shield.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4A is a schematic illustration of a write head according to one embodiment. FIG. 4B is a detailed illustration of the main pole of FIG. 4A.

FIG. 4C is a detailed illustration of the trailing shield of FIG. 4A. FIG. 4D is a detailed illustration of the side shields of FIG. 4A. FIG. 4E is a detailed illustration of the leading shield of FIG. 4A.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Magnetic moments can be increased in hard disk drive (HDD) shields and ferromagnetic layers to minimize magnetic saturation while still maintaining low magnetic coercivity (Hc) and high saturated magnetic flux (Bs). A textured layer can be used to induce nucleation and growth of an interfacial nature such that body centered cubic (BCC) ferromagnetic materials with high Bs and low Hc are obtained while also increasing the magnetic moment. The textured layer will cause the ferromagnetic material to grow with low Hc regardless of the crystallographic orientation.

Figure 1:
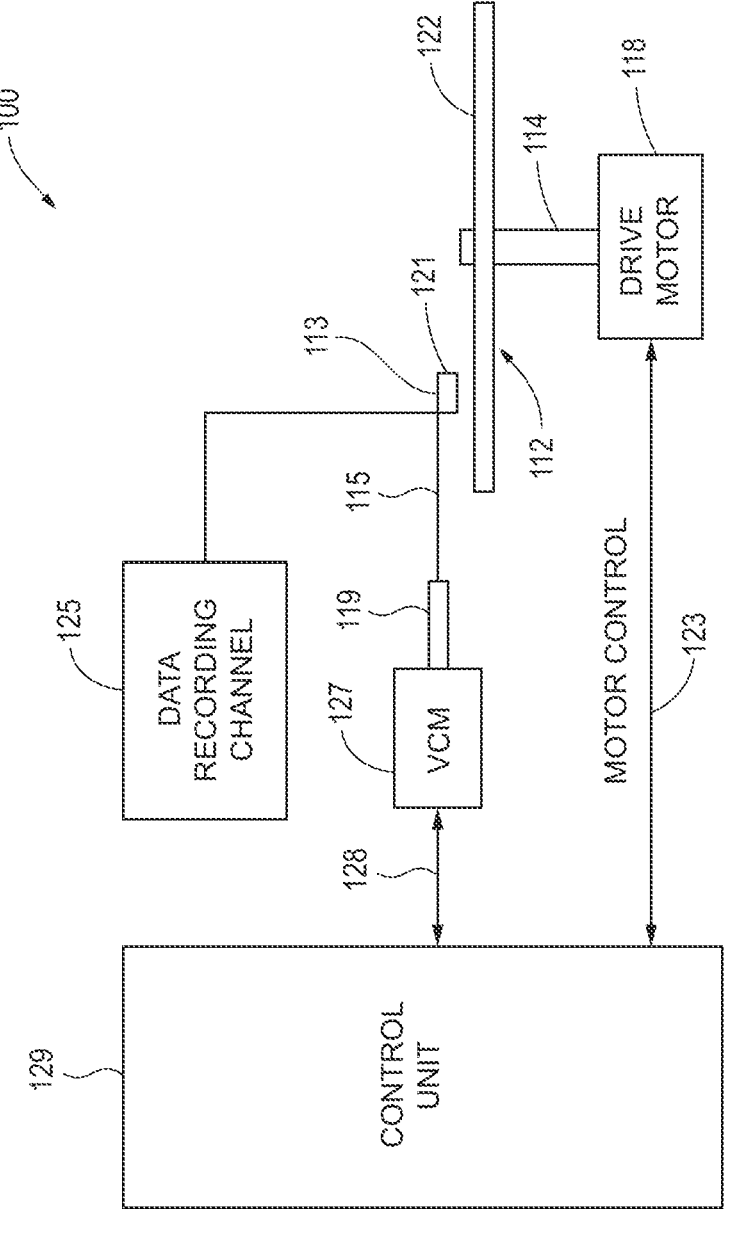
FIG. 1 illustrates a disk drive embodying this disclosure.

FIG. 1 is a schematic illustration of a magnetic recording device 100, according to one implementation. The magnetic recording device 100 includes a magnetic recording head, such as a write head. The magnetic recording device 100 is a magnetic media drive, such as a HDD. Such magnetic media drives may be a single drive/device or include multiple drives/devices. For the ease of illustration, a single disk drive is shown as the magnetic recording device 100 in the implementation illustrated in FIG. 1. The magnet recording device 100 (e.g., a disk drive) includes at least one rotatable magnetic disk 112 supported on a spindle 114 and rotated by a drive motor 118. The magnetic recording on each rotatable magnetic disk 112 is in the form of any suitable patterns of data tracks, such as annular patterns of concentric data tracks on the rotatable magnetic disk 112.

At least one slider 113 is positioned near the rotatable magnetic disk 112. Each slider 113 supports a head assembly 121. The head assembly 121 includes one or more magnetic recording heads (such as read/write heads), such as a write head. As the rotatable magnetic disk 112 rotates, the slider 113 moves radially in and out over the disk surface 122 so that the head assembly 121 may access different tracks of the rotatable magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by a control unit 129.

The head assembly 121, such as a write head of the head assembly 121, includes a media facing surface (MFS) such as an air bearing surface (ABS) that faces the disk surface 122. During operation of the magnetic recording device 100, the rotation of the rotatable magnetic disk 112 generates an air or gas bearing between the slider 113 and the disk surface 122 which exerts an upward force or lift on the slider 113. The air or gas bearing thus counter-balances the slight spring force of suspension 115 and supports the slider 113 off and slightly above the disk surface 122 by a small, substantially constant spacing during operation.

The various components of the magnetic recording device 100 are controlled in operation by control signals generated by control unit 129, such as access control signals and internal clock signals. The control unit 129 includes logic control circuits, storage means and a microprocessor. The control unit 129 generates control signals to control various system operations such as drive motor control signals on a line 123 and head position and seek control signals on a line 128. The control signals on line 128 provide the desired current profiles to optimally move and position slider 113 to the desired data track on rotatable magnetic disk 112. Write and read signals are communicated to and from the head assembly 121 by way of recording channel 125. In one embodiment, which can be combined with other embodiments, the magnetic recording device 100 may further include a plurality of media, or disks, a plurality of actuators, and/or a plurality number of sliders.

Figure 2:
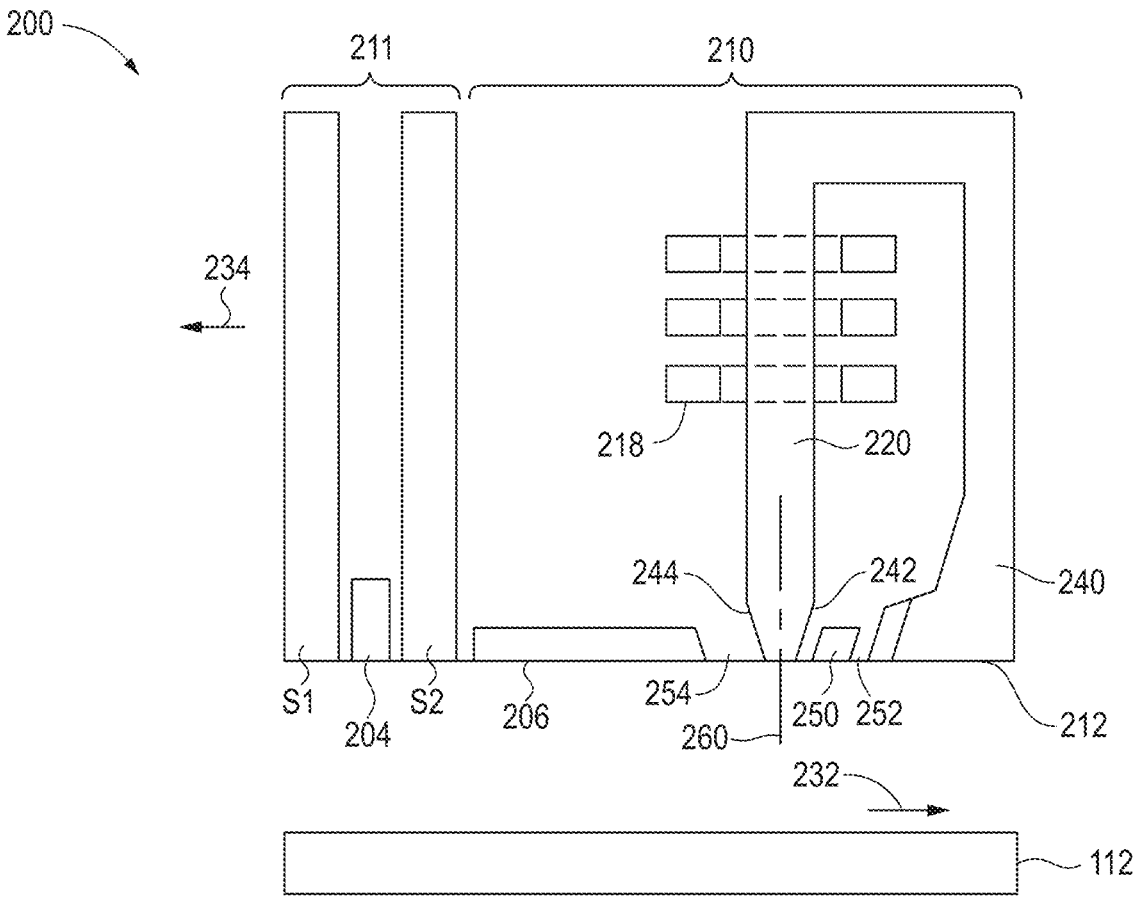
FIG. 2 is a fragmented, cross-sectional side view through the center of a read/write head facing a magnetic media, according to one embodiment.

FIG. 2 is a schematic illustration of a cross sectional side view of a head assembly 200 facing the rotatable magnetic disk 112 shown in FIG. 1 or other magnetic storage medium, according to one implementation. The head assembly 200 may correspond to the head assembly 121 described in FIG. 1. The head assembly 200 includes a MFS 212, such as an ABS, facing the rotatable magnetic disk 112. As shown in FIG. 2, the rotatable magnetic disk 112 relatively moves in the direction indicated by the arrow 232 and the head assembly 200 relatively moves in the direction indicated by the arrow 234.

In one embodiment, which can be combined with other embodiments, the head assembly 200 includes a magnetic read head 211. The magnetic read head 211 may include a sensing element 204 disposed between shields S1 and S2. The sensing element 204 is a magnetoresistive (MR) sensing element, such as an element exerting a tunneling magneto-resistive (TMR) effect, a magneto-resistance (GMR) effect, an extraordinary magneto-Resistive (EMR) effect, a spin orbit torque (SOT) effect or a spin torque oscillator (STO) effect. The magnetic fields of magnetized regions in the rotatable magnetic disk 112, such as perpendicular recorded bits or longitudinal recorded bits, are detectable by the sensing element 204 as the recorded bits. Here, magnetic read head 211 is a simplified representation of the various disclosed embodiments which will include multiple sensing elements and shields as further described below.

The head assembly 200 includes a write head 210. In one embodiment, which can be combined with other embodiments, the write head 210 includes a main pole 220, a leading shield 206, and a trailing shield (TS) 240. The main pole 220 serves as a first electrode. Each of the main pole 220, the leading shield 206, and the trailing shield (TS) 240 has a front portion at the MFS.

The main pole 220 includes a magnetic material, such as CoFe, CoFeNi, or FeNi, other suitable magnetic materials. In one embodiment, which can be combined with other embodiments, the main pole 220 includes small grains of magnetic materials in a random texture, such as body-centered cubic (BCC) materials formed in a random texture. In one example, a random texture of the main pole 220 is formed by electrodeposition. The write head 210 includes a coil 218 around the main pole 220 that excites the main pole 220 to produce a writing magnetic field for affecting a magnetic recording medium of the rotatable magnetic disk 112. The coil 218 may be a helical structure or one or more sets of pancake structures.

In one embodiment, which can be combined with other embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In one embodiment, which can be combined with other embodiments, the main pole 220 does not include the trailing taper 242 and the leading taper 244. In such an embodiment, the main pole 220 includes a trailing side and a leading side in which the trailing side and the leading side are substantially parallel.

The TS 240 includes a magnetic material, such as FeNi, or other suitable magnetic materials, serving as a second electrode and return pole for the main pole 220. The leading shield 206 may provide electromagnetic shielding and is separated from the main pole 220 by a leading gap 254. A trailing gap 252 is present between the main pole 220 and the TS 240. As shown in FIG. 2, one or more structures 250 may be present in the trailing gap 252.

As noted above, the HDD's head includes reader and writer component shields that capture stray fields, such as in the reader, and improve field gradient, such as in the writer. For such shields to be effective, they typically have high magnetic coercivity (Hc) (e.g., 60 Oe or greater) as opposed to low Hc (e.g., 20 Oe or less). Shields, such as those made from NiFe 80/20, have low Hc and low magnetic moments. However, there is a desire to have shields with even higher moments, using materials such as body centered cubic (BCC) CoFe, or alloys thereof, with increased Bs to reduce earlier magnetic saturation. As will be discussed herein, textured RuAl seed layers, for example, induce nucleation and growth of an interfacial nature such that high moment CoFe, or alloys thereof, will grow with low Hc regardless of the crystallographic orientation. Obtaining high Bs with low Hc for various structures of the magnetic recording head is discussed herein. To obtain higher magnetic moments, BCC CoFe will be exemplified.

TABLE I

| Film | B2, Tesla | Bs, A | Hc | Hk |
|---|---|---|---|---|
| CoFe70 | 2.19 | 2184.1 | 101.4 | 25.5 |
| RuAl/CoFe70 | 2.33 | 2345.5 | 17.1 | 24.8 |
| RuAl/CoFe70 | 2.31 | 2332.6 | 19.4 | 24.9 |
| RuAl/CoFe70 | 2.32 | 2341.1 | 17.7 | 25.0 |

In Table I, the properties of the CoFe70 film formed on an amorphous substrate is shown as a baseline comparison to the CoFe70 films formed on the poor quality (i.e., non-epitaxial) RuAl films. The CoFe films are a mix of (100) and (110) orientations for Table I. CoFe typically has a substantial (110) growth with a mixture of (100) growth. As shown in the first row of Table I, the CoFe formed on an amorphous substrate has a high Hc and high Bs. When using poor quality RuAl films as substrates, Hc is significantly reduced while the magnetic permeability (Hk) remains steady. In Table II, the RuAl layer is a higher quality film (i.e., epitaxial) and grown with a higher quality (100) orientation and grain size, and the RuAl layer leads to subsequent (100) orientation CoFe rather than randomly oriented CoFe. In Table II, Hce is the magnetic coercivity along easy axis, Hch is the magnetic coercivity along hard axis. Sqre is the squareness of hysteresis curve along the easy axis, and Sqrh is the squareness of hysteresis curve along the hard axis loops. The texture is the CoFe orientation based on X-ray diffraction. It is to be understood that the terms orientation and texture may be used interchangeably throughout the disclosure.

TABLE II

| Buffer layer used in CoFe (with RuAl textured layer/substrate) | Hce | Sqre | Hch | Sqrh | Texture |
|---|---|---|---|---|---|
| Ex-situ 100 Cr seed with pre-etch oxide removal | 20.67 | 0.9394 | 17.81 | 0.9166 | 100 |
| In-situ 100 Cr seed and FeCo | 20.76 | 0.936 | 17.99 | 0.937 | 100 |
| FeCo on SiO2 | 77.66 | 0.9781 | 76.06 | 0.9743 | 110 |
| In-situ 110 Cr seed and FeCo | 64.78 | 0.9757 | 63.46 | 0.9757 | 110 |

The advantage of a (100) orientation is that the (100) orientation has a higher quality interface with lower roughness that leads to less migration (e.g., if combined with some other materials such as SOT materials) and higher thermal reliability. The (100) orientation gives low Hc because the (100) orientation is the crystallographic orientation having the most number of planes with low Hc. The (100) orientation of CoFe has the largest set of easy axis planes and the lowest Hc of any direction. Therefore, growing a highly textured CoFe film with a (100) orientation is generally preferred to get low Hc.

However, RuAl seed layer is an unusual seed layer because regardless of quality, RuAl will induce nucleation/growth of an interfacial nature such that CoFe will grow with low Hc irrespective of the crystallographic orientation. As noted above, Table I shows a poor quality (i.e., non-epitaxial) RuAl film while Table II shows a high quality (i.e., epitaxial) RuAl film. In both cases, Hc for CoFe has remained low regardless of the quality. In particular, in Table II, a RuAl seed layer with (100) texture is deposited and thereafter a buffer layer is formed thereover with a CoFe layer formed thereon. In one example, an ex-situ (100) Cr layer is formed on the RuAl seed layer followed by the CoFe layer having a (100) texture. In another example, an in-situ (100) Cr layer is formed on the RuAl seed layer followed by the CoFe layer having a (100) texture. In yet another example, a SiO₂ layer is formed on the RuAl seed layer followed by the CoFe layer having a (110) texture. In still another embodiment, an ex-situ (110) Cr layer is formed on the RuAl seed layer followed by the CoFe layer having a (110) texture. The (110) texture for the CoFe is due to the underlying layer having with a (110) texture. In both the SiO₂ layer and the (110) Cr layer embodiments, Hc is high as compared to the (100) Cr layer embodiments.

Additionally, high polycrystalline epitaxial films with low roughness are more desirable for SOT film stacks. Therefore, epitaxial SOT stacks, if combined with (100) orientation CoFe ferromagnetic (FM) layers, are more thermally robust with less intermixing. The reverse is also true. A highly textured BiSbX (012) orientation film, for example, can grow a strong (100) orientation CoFeX FM layer (e.g., bottom SOT stack where in this example the BiSbX is the SOT layer under the CoFeX FM layer), using a layer which doesn't readily interact with the SOT layer, and has an a-axis in the range of 2.93 Å to 3.00 Å or face centered cubic (FCC) in the range of sqrt (2)*BCC axis or with a Heusler in the 2× range for a cF16 type structure.

An amorphous layer can be used to reset crystallographic orientation. A metallic layer on top of an amorphous layer will start a texturing process to enhance the texturing of a subsequent layer to a (100) orientation. For example, depositing RuAl with high (100) orientation and high grain size on an amorphous layer is easily accomplished. While the amorphous seed layer is usually used to reset the crystallographic orientation, the (100) orientation growth but substantial growth can also be accomplished without the amorphous seed layer.

To achieve FeCo with the aforementioned properties of low Hc and high (100) orientation, a film structure comprising an amorphous seed layer and a (100) orientation enabling layer can be used. The amorphous seed layer may be a metallic layer, a nitride layer, or an ionic layer that disrupts underlying crystal seeding effects. For the metallic layer, NiZr, NiTa, NiNb, NiTaFe, NiFeW, NiW, and combinations thereof can be used. For the nitride layer, NiZrN, NiTaN, NiNbN, NiTaFeN, NiFeWN, NiWN, and combinations thereof can be used. For the ionic layer, Al₂O₃, SiO₂, or other insulating material, and combinations therefore can be used.

The (100) orientation enabling layer may comprise RuAl. As shown previously in Table II, textured RuAl with Cr over it provides an effective way to grow a (100) textured BCC ferromagnetic layer with high Bs and low Hc. Thus, in various embodiments, RuAl, acting as a (100) texture BCC seeding layer, is paired with Cr, acting as a high surface energy BCC seeding/buffer layer, on the RuAl. Besides RuAl, other (100) texture BCC enabling material options can include CrMo (e.g., Mo of 30-50 atomic percent). In some embodiments, chromium (Cr) heated at greater than 250 Celsius will grow it with a (100) orientation predominately. In one embodiment, RuAl that enables growth of (100) orientation Cr comprises aluminum (Al) at about 45 atomic percent, with ruthenium (Ru) at 55 atomic percent. In other embodiments, the content of Ru can have a range of 48-58 atomic percent. The (100) orientation enabling layer, and RuAl in particular, is an interfacial nucleation layer that lowers Hc regardless of the crystallographic orientation. In some embodiments, the Cr layer over the (100) orientation enabling layer may be omitted, or substituted by another seed/buffer layer with suitable materials (e.g., another high surface energy BCC layer) for the ferromagnetic layer that will grow on or over it. Example suitable materials are further described in connection with the high Rs layer 408 in FIGS. 4A-4G.

Figure 3:
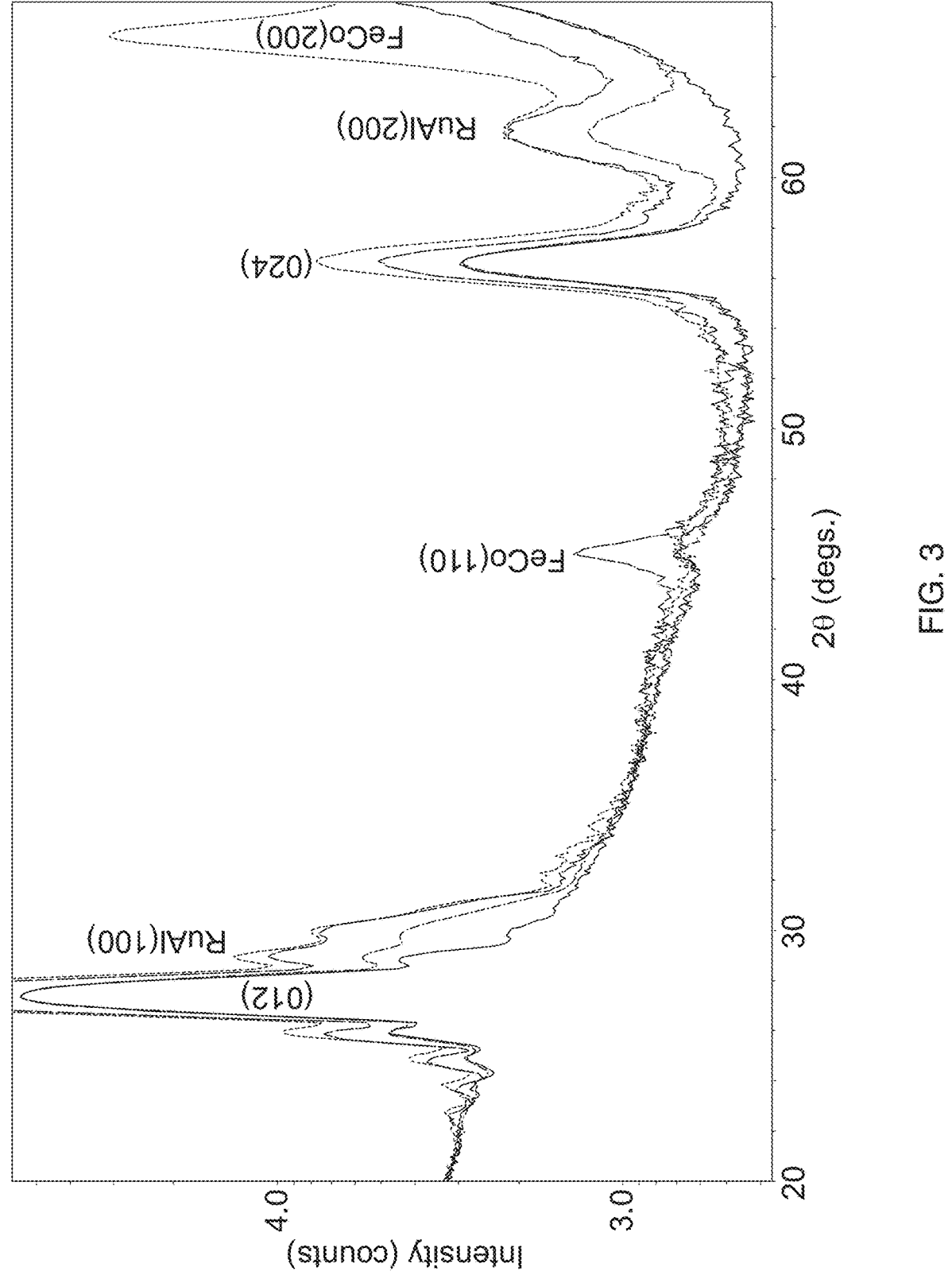
FIG. 3 is a graph illustrating crystallographic intensity for a FeCo layer according to one embodiment.

FIG. 3 is a graph illustrating crystallographic intensity for a FeCo layer within a stack. The stack, from bottom to top, contains a RuAl (100) seed layer, an SOT layer of BiSb, and an FM layer of FeCo, among other layers. FIG. 3 shows that a RuAl (100) orientation seed layer has a strong (100) orientation growth, which in turn causes a BiSb layer to grow with a strong (012) orientation. The strong (012) orientation can benefit a strong (100) orientation on subsequently deposited layers, such as a texture transfer layer or a ferromagnetic layer. For example, a strong BiSb (012) orientation will cause an NiAl layer (i.e., a texture transfer layer) to grow with a strong (100) orientation, which in turn will cause a Fe60Co40 layer (i.e., a ferromagnetic layer) to grow with a strong (100) orientation. A texture transfer layer, which may be referred to as an insertion layer (e.g., NiAl or other similar lattice parameter from 2.93 Å to 3.00 Å) is beneficial to promote a (100) orientation film from a (012) orientation film.

As discussed herein, obtaining a desired orientation, in particular a (100) orientation, for a FeCo layer will result in higher moments with increased Bs with low Hc to reduce earlier magnetic saturation. To obtain the (100) orientation, the texture can be induced by a texture enabling structure formed over a non-textured layer. Alternatively, if texturing is already present in a lower layer and needs to be continued or transferred from the lower layer, a texture transfer structure may be used. The texture transfer structure may be alternatively referred to as a texture transfer layer, when it is in the form of a single layer. Both the texture transfer structure and the texture enabling structure will be discussed below. Broadly, both the texture transfer structure and the texture enabling structure can be referred to as a texture structure with an understanding that when a texture is to be created, the texture structure will be a texture enabling structure, and when a texture is to be continued or transferred the texture structure will be a texture transfer structure.

Figures 4F, 4G:
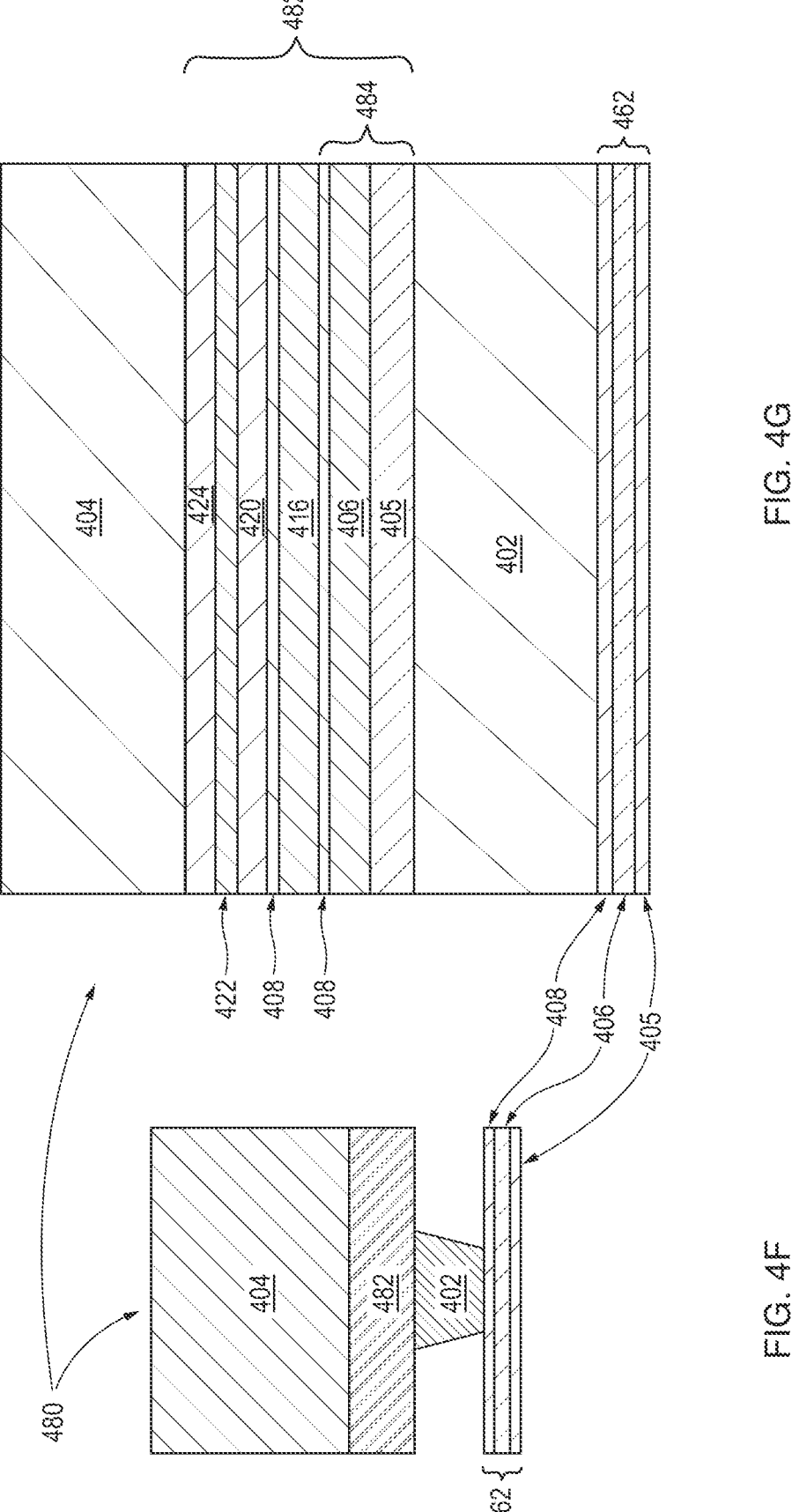
FIG. 4F is a media facing surface (MFS) view of a write head according to one embodiment.
FIG. 4G is a cross section illustration of the write head of FIG. 4F.

FIG. 4A is a schematic illustration of a write head according to one embodiment. FIG. 4B is a detailed illustration of the main pole of FIG. 4A. FIG. 4C is a detailed illustration of the trailing shield of FIG. 4A. FIG. 4D is a detailed illustration of the side shields of FIG. 4A. FIG. 4E is a detailed illustration of the leading shield of FIG. 4A. FIG. 4F is a schematic illustration of a write head according to another embodiment. FIG. 4G is a schematic illustration of the write head of FIG. 4F.

FIG. 4A is an MFS view of a write head according to one or more embodiments. The write head includes a main pole 402, a leading shield 430, side shields 440, and a trailing shield 404. Insulating material 470 is disposed within the head. In FIG. 4A, the main pole 402 is disposed on a texture enabling structure 462, the side shields 440 are disposed on a texture enabling structure 442, the leading shield 430 is disposed on a texture enabling structure 432, and the trailing shield 404 is disposed on a texture enabling structure 410.

It is to be understood that while each of the main pole 402, trailing shield 404, side shields 440, and leading shield 430 can have texture enabling structures 462, 410, 442, 432, not all of the main pole 402, trailing shield 404, side shields 440, and leading shield 430 necessarily have texture enabling structures 462, 410, 442, 432 in every embodiment. For example, it is contemplated that one or more of the main pole 402, trailing shield 404, side shields 440, and leading shield 430 have texture enabling structures 462, 410, 442, 432. In other words either all of the main pole 402, trailing shield 404, side shields 440, and leading shield 430 have texture enabling structures 462, 410, 442, 432 or less than all of the main pole 402, trailing shield 404, side shields 440, and leading shield 430 have texture enabling structures 462, 410, 442, 432. Stated another way, the disclosure is not to be limited to each of the main pole 402, trailing shield 404, side shields 440, and leading shield 430 having texture enabling structures 462, 410, 442, 432.

FIG. 4B shows the main pole 402 and more details of the texture enabling structure 462. The main pole 402 includes a magnetic material, such as CoFe, CoFeNi, NiFe, or FeNiRe, other suitable magnetic materials. In one embodiment, which can be combined with other embodiments, the main pole 402 includes small grains of magnetic materials in a random texture, such as body-centered cubic (BCC) materials formed in a random texture. In one example, a random texture of the main pole 402 is formed by electrodeposition.

For the main pole 402, a texture can be induced by the texture enabling structure 462 upon which the main pole 402 will be formed. The texture enabling structure 462 includes an amorphous layer 405, a (100) orientation enabling layer 406 thereon, and a higher sheet resistance (Rs) layer 408. It is contemplated that the amorphous layer 405, (100) orientation enabling layer 406, and higher Rs layer 408 may all be present. It is also contemplated that the amorphous layer 405 and (100) orientation enabling layer 406 may be present while the higher Rs layer 408 is not present. Similarly, it is also contemplated that the amorphous layer 405 and (100) orientation enabling layer 406 may not be present while the higher Rs layer 408 is present.

Suitable materials for the amorphous layer 405 include a metallic layer, a nitride layer, or an ionic layer that disrupts underlying crystal seeding effects. For the metallic layer, NiZr, NiTa, NiNb, NiTaFe, NiFeW, NiW, and combinations thereof can be used. For the nitride layer, NiZrN, NiTaN, NiNbN, NiTaFeN, NiFeWN, NiWN, and combinations thereof can be used. For the ionic layer, $Al_2O_3$, $SiO_2$, or other insulating material, and combinations thereof can be used.

The (100) orientation enabling layer may comprise RuAl. As shown previously in Table II, textured RuAl with Cr over it provides an effective way to grow a (100) textured BCC ferromagnetic layer with high Bs and low Hc. Thus, in various embodiments, RuAl, acting as a (100) texture BCC seeding layer, is paired with Cr, acting as a high surface energy BCC seeding/buffer layer, on the RuAl. Besides RuAl, other (100) texture BCC enabling material options can include CrMo (e.g., Mo of 30-50 atomic percent). In some embodiments, chromium (Cr) heated at greater than 250 Celsius will grow it with a (100) orientation predominately. In one embodiment, RuAl that enables growth of (100) orientation Cr comprises aluminum (Al) at about 45 atomic percent, with ruthenium (Ru) at 55 atomic percent. In other embodiments, the content of Ru can have a range of 48-58 atomic percent. The (100) orientation enabling layer 406, and RuAl in particular, is an interfacial nucleation layer that lowers Hc regardless of the crystallographic orientation. In some embodiments, the Cr layer over the (100) orientation enabling layer may be omitted, or substituted by another seed/buffer layer with suitable materials (e.g., another high surface energy BCC layer) for the ferromagnetic layer that will grow on or over it. Example suitable materials are further described in connection with the high Rs layer 408 in FIGS. 4A-4G. The (100) orientation layers may in general be deposited on heated films/substrates.

Suitable materials for the higher Rs layer 408 include BCC metals such as Cr, Mo, V, W, or Ta; a B2 layer such as NiAl, IrAl, CoAl, RhAl, or RuAl; or a multilayer structure comprising a B2 layer, MgO, and another B2 layer.

FIG. 4C shows the trailing shield 404 and more details of the texture enabling structure 410. The trailing shield 404 includes magnetic material, such as FeNi or CoFe, or other suitable magnetic materials. In one embodiment, the trailing shield 404 comprises CoFe having a (100) orientation.

For the trailing shield 404, a texture can be induced by the texture enabling structure 410 upon which the trailing shield 404 will be formed. The texture enabling structure 410 includes the amorphous layer 405, the (100) orientation enabling layer 406 thereon, and the higher Rs layer 408. It is contemplated that the amorphous layer 405, (100) orientation enabling layer 406, and higher Rs layer 408 may all be present. It is also contemplated that the amorphous layer 405 and (100) orientation enabling layer 406 may be present while the higher Rs layer 408 is not present. Similarly, it is also contemplated that the amorphous layer 405 and (100) orientation enabling layer 406 may not be present while the higher Rs layer 408 is present.

FIG. 4D shows the side shield 440 and more details of the texture enabling structure 442. The side shield 440 includes magnetic material, such as FeNi or CoFe, or other suitable magnetic materials. In one embodiment, the side shield 440 comprises NiFe, CoFe, NiFeCo, CoFeHf, CoFeCr, or combinations thereof.

For the side shield 440, a texture can be induced by the texture enabling structure 442 upon which the side shield 440 will be formed. The texture enabling structure 442 includes the amorphous layer 405, the (100) orientation enabling layer 406 thereon, and the higher Rs layer 408. It is contemplated that the amorphous layer 405, (100) orientation enabling layer 406, and higher Rs layer 408 may all be present. It is also contemplated that the amorphous layer 405 and (100) orientation enabling layer 406 may be present while the higher Rs layer 408 is not present. Similarly, it is also contemplated that the amorphous layer 405 and (100) orientation enabling layer 406 may not be present while the higher Rs layer 408 is present.

FIG. 4E shows the leading shield 430 and more details of the texture enabling structure 432. The leading shield 430 includes magnetic material, such as FeNi or CoFe, or other suitable magnetic materials. In one embodiment, the leading shield 430 comprises CoFe having a (100) orientation.

For the leading shield 430, a texture can be induced by the texture enabling structure 432 upon which the leading shield 430 will be formed. The texture enabling structure 432 includes the amorphous layer 405, the (100) orientation enabling layer 406 thereon, and a higher Rs layer 408. It is contemplated that the amorphous layer 405, (100) orientation enabling layer 406, and higher Rs layer 408 may all be present. It is also contemplated that the amorphous layer 405 and (100) orientation enabling layer 406 may be present while the higher Rs layer 408 is not present. Similarly, it is also contemplated that the amorphous layer 405 and (100) orientation enabling layer 406 may not be present while the higher Rs layer 408 is present.

FIG. 4F is a cross section illustration of the write head 480 according to another embodiment. The write head 480 includes a SOT layer. FIG. 4G is a cross section illustration of the write head of FIG. 4F. The write head 480 includes a main pole 402 and a trailing shield 404.

A structure 482 may then be disposed in the trailing gap between the main pole 402 and the trailing shield 404. In one embodiment, the structure 482 has a thickness of between about 18 nm and about 25 nm.

The structure 482 includes a texture enabling structure 484 comprising an amorphous layer 405 and a (100) orientation enabling layer 406 formed thereon followed by a higher Rs layer 408. Suitable materials for the higher Rs layer 408, the amorphous layer 405, and the (100) orientation enabling layer 406 are as discussed above.

The texture enabling structure 484 is used to form a textured layer thereover, namely, a spin orbit torque (SOT) layer 416. The SOT layer 416 may optionally be referred to as a spin Hall effect (SHE) layer. The SOT layer 416 comprises a heavy metal with strong spin orbital coupling, such as Ta, Pt, W, Hf, etc. The SOT layer 416 can comprise a topological insulator material, such as BiSe, WTe, YPtBi, or BiSb. The SOT layer 416 may comprise BiSb in a (012) orientation. The SOT layer 416 may comprise undoped BiSb or doped BiSbX, where the dopant is less than about 10 at. %, and where X is extracted from elements which don't readily interact with Bi, such as B, N, Al, Si, Ti, V, Cr, Fe, Ni, Cu, Ge, Y, Zr, Ru, Mo, Ag, Hf, Ta, W, or Ir, or in alloy combinations with one or more of aforementioned elements, like CuAg, CuNi, RuGe, etc. More generally, some of the listed dopants may be used with other topological insulator materials other than BiSb.

Now that a texture has been established, namely the SOT layer 416 being a (012) layer, a texture transfer layer is formed thereover to ensure a texture is transferred or continued to a later formed layer. In particular, over the SOT layer 416, a higher Rs layer 408 is deposited. Suitable materials for the higher Rs layer 408 are as discussed above. Thereafter, a BCC FM layer or Heusler layer 420 is deposited on the higher Rs layer 408, which has a (100) orientation induced by the SOT layer 416. An insulating layer 422 is then formed on the FM or Heusler layer 420. Suitable materials for the insulating layer 422 include insulators such as MgO. A texture transfer layer 424 is then formed on the insulating layer 422. Suitable materials for the texture transfer layer 424 are as discussed above (e.g., NiAl). The trailing shield 404 is then formed thereon.

The orientation induced by the strong texturing enabling structure 462 produces a textured main pole 402, but the orientation does not extend through the entire thickness of the main pole 402 due to the thickness of the main pole 402. Similarly, the texture transfer layer 424 produces a textured trailing shield 404, but the orientation does not extend through the entire thickness of the trailing shield 404 due to the thickness of the trailing shield 404. The induced orientation will generally extend an initial thickness of less than about 0.2 μm after which the main pole 402 or trailing shield 404 will tend to grow gradually in a more random direction. Thus, it is possible to ensure that a (100) orientation occurs after an amorphous layer is deposited (i.e., depositing a (100) orientation enabling layer), i.e., as part of a texture enabling structure, or that a (100) orientation occurs after an already textured layer is deposited, via a texture transfer layer/structure.

Moreover, the texture enabling structure 484 is useful for forming the SOT layer 416 having a strong (012) orientation. The strong (012) orientation can be used in conjunction with a texture transfer structure to ensure a strong (100) orientation in FM materials. For example, a texture can be initially present, such as with the SOT layer 416 having a (012) orientation due to the texture enabling structure 484, and the (012) orientation induces a (100) orientation in the FM layer 420, which in turn, via the texture transfer layer 424, ensures a (100) orientation forms later in a portion of the trailing shield 404. The texture transfer layer 424 induces a low Rs, high moment, low Hc ferromagnetic material to be formed (i.e., the trailing shield 404). Alternatively, the texture enabling structure 484 can be used to induce a strong (100) orientation in an FM layer in a stack without an SOT layer, and the texture transfer layer 424 can be similarly applied to induce the desired properties of the trailing shield 404.

Figure 5:
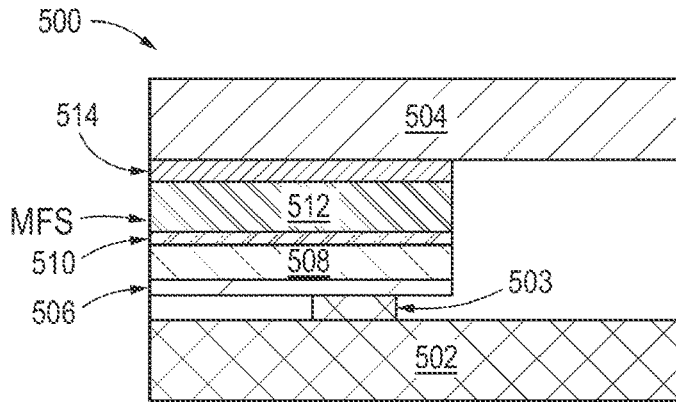
FIGS. 5-7, 8A, and 8B are schematic illustrations of read heads according to various embodiments.

FIGS. 5-7, 8A, and 8B are schematic illustrations of read heads according to various embodiments. FIG. 5 exemplifies a read head 500 according to one embodiment. The read head 500 comprises a lower shield 502 and an upper shield 504. High permeability, low Hc materials such as Ni80Fe20 have low moment is one possibility for the lower and upper shields 502, 504, but there is a desire for higher moments, such as shields comprising BCC CoFe and alloys thereof, with increased magnetic permeability to minimize saturation. Using texturing, BCC CoFe and alloys thereof can be useful materials for both the lower shield 502 and the upper shield 504.

Generally, the lower shield 502 is not (100) oriented, but rather, is more randomly oriented. However, it is contemplated that the lower shield 502 may have a (100) orientation for a portion of the thickness, but the (100) orientation would not persist throughout the thickness. Basically, the further away from the bottom of the lower shield 502, the more random the orientation such that the top surface of the lower shield 502 would be randomly oriented. The lower shield 502 has an optional notch 503 formed thereover in one embodiment. Over the lower shield 502, a first texture structure 506 is formed. Thereover, a SOT layer 508 is formed. A second texture structure 510 is formed over the SOT layer 508 followed by a ferromagnetic (FM) layer 512. A third layer 514 is formed thereover followed by the upper shield 504.

The texture structure 506 is present between the lower shield 502 and the SOT layer 508 to ensure the SOT layer 508 has a texture. As the lower shield 502 is randomly oriented, the texture structure 506 is a texture enabling structure. In such embodiment, the texture structure 506 comprises an amorphous layer having materials as discussed above, a (100) orientation enabling layer having materials as described above, an insulating layer, and a texture transfer layer (e.g., NiAl, IrAl, CoAl, RhAl, or RuAl) configured to create a texture in the SOT layer 508.

The second texture structure 510 is a texture transfer structure because the SOT layer 508 already has a texture, and the FM layer 512 will have a texture due to the second texture structure 510. The second texture structure 510 comprises a multilayer structure. In one embodiment, the second texture structure 510 comprises a first layer comprising NiAl (or similar bcc-B2 lattice parameter material) followed by a second layer comprising RuAl or other (100) orientation enabling layer. In another embodiment, the second texture structure 510 comprises a first layer comprising NiAl (or similar bcc-B2 lattice parameter material) followed by a second layer MgO (or MgTiO, if high Rs is needed), followed by a third layer comprising RuAl or other (100) orientation enabling layer. The first layer being NiAl is particularly preferred in one embodiment because NiAl will not interact with the layer formed therebelow whereas other materials may interact with the layer formed therebelow (e.g., the SOT layer). The FM layer 512 is formed on the second texture structure 510. Various options exist for a layer 514 that is formed over the FM layer 512. In one embodiment, the layer 514 may comprise an amorphous material. In another embodiment, the layer 514 may comprise a texture transfer layer. In yet another embodiment, the third layer 514 may comprise a texture structure identical to the second texture structure 510. Over the third layer 514, the upper shield 504 is formed.

The (100) orientation enabling layer may comprise RuAl. As shown previously in Table II, textured RuAl with Cr over it provides an effective way to grow a (100) textured BCC ferromagnetic layer with high Bs and low Hc. Thus, in various embodiments, RuAl, acting as a (100) texture BCC seeding layer, is paired with Cr, acting as a high surface energy BCC seeding/buffer layer, on the RuAl. Besides RuAl, other (100) texture BCC enabling material options can include CrMo (e.g., Mo of 30-50 atomic percent). In some embodiments, chromium (Cr) heated at greater than 250 Celsius will grow it with a (100) orientation predominately. In one embodiment, RuAl that enables growth of (100) orientation Cr comprises aluminum (Al) at about 45 atomic percent, with ruthenium (Ru) at 55 atomic percent. In other embodiments, the content of Ru can have a range of 48-58 atomic percent. The (100) orientation enabling layer 406, and RuAl in particular, is an interfacial nucleation layer that lowers Hc regardless of the crystallographic orientation. In some embodiments, the Cr over the (100) orientation enabling layer may be omitted, or substituted by another seed/buffer layer with suitable materials (e.g., another high surface energy BCC layer) for the ferromagnetic layer that will grow on or over it. Example suitable materials are further described in connection with the high Rs layer 408 in FIGS. 4A-4G. The (100) orientation layers may in general be deposited on heated films/substrates.

Suitable materials for the amorphous layer include a metallic layer, a nitride layer, or an ionic layer that disrupts underlying crystal seeding effects. For the metallic layer, NiZr, NiTa, NiNb, NiTaFe, NiFeW, NiW, and combinations thereof can be used. For the nitride layer, NiZrN, NiTaN, NiNbN, NiTaFeN, NiFeWN, NiWN, and combinations thereof can be used. For the ionic layer, $Al_2O_3$, $SiO_2$, or other insulating material, and combinations therefore can be used.

Suitable materials for the texture transfer layer include higher Rs materials such as BCC metals such as Cr, Mo, V, W, or Ta; a B2 layer such as NiAl, IrAl, CoAl, RhAl, or RuAl; or a multilayer structure comprising a B2 layer, MgO, and another B2 layer.

Figure 6:
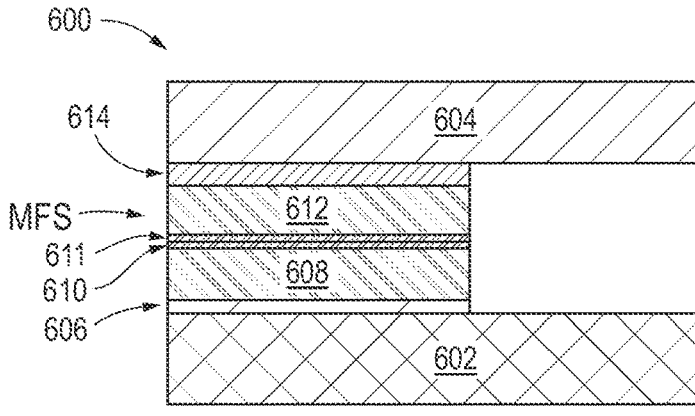

FIG. 6 shows a read head 600 that comprises a lower shield 602 and an upper shield 604. The reader 600 includes a first texture structure 606 disposed over the lower shield 602, a first ferromagnetic layer 608 disposed over the first texture structure 606, a second texture structure 610 disposed over the first ferromagnetic layer 608, a second ferromagnetic layer 612 disposed over the second texture structure 610, and a third texture structure 614 disposed over the second ferromagnetic layer 612 with the upper shield 604 formed thereover. Both the lower shield 602 and the upper shield 604 comprise CoFeX based materials.

The first and second ferromagnetic layers 608, 612 may comprise any ferromagnetic material. The first texture structure 606 may be a texture enabling structure when the lower shield 602 is not textured. The first texture structure 606 may be a texture transfer structure comprising a texture transfer layer when the lower shield 602 is textured. In one embodiment, the first texture structure 606 is a texture enabling structure and comprises an amorphous layer having materials as discussed above, a (100) orientation enabling layer having materials as described above, and an insulating layer.

If the first ferromagnetic layer 608 is not BCC CoFeX, then the insulating layer is optional.

The second texture structure 610 is used to form a textured second ferromagnetic layer 612 and is a texture transfer structure, comprising a texture transfer layer having materials as described above to ensure the second ferromagnetic layer 612 is textured. Some examples include MgO and a multi-layer structure NiAl/MgO/NiAl ("/" denoting layer separation, where NiAl can be substituted with other similar BCC, B2 materials having comparable a-axis spacing).

The third texture structure 614 is also a texture transfer structure, comprising a texture transfer layer having materials as described above to ensure the upper shield 604 is textured. Some examples include MgO, RuAl and a multi-layer structure MgO/NiAl ("/" denoting layer separation, where NiAl can be substituted with other similar BCC, B2 materials having comparable a-axis spacing).

The first texture structure 606 is used to transfer texture to the first ferromagnetic layer 608 in the case where the lower shield 602 is textured, or to create a texture for the first ferromagnetic layer 608 when the lower shield 602 is not textured. Similarly, the second texture structure 610 is used to transfer texture to the second ferromagnetic layer 612. The texture transfer structure is much like the texture transfer structures discussed above. One or more oxide layers 611 (e.g., MgO) for spin tunneling effect such as used in magnetic tunnel junctions is disposed on the second texture structure 610. Finally, the third texture structure 614 is used to transfer texture to the upper shield 604, much like the texture transfer structures discussed above. Alternatively, the third texture structure 614 can be amorphous if texture transfer to the upper shield is not needed.

In some embodiments, in any of texture structures 606 (when the lower shield 602 is textured), 610, 614, there is a texture transfer layer. Optionally, in any of the texture structure 606, 610, 614, an amorphous and/or insulating layer is/are additionally present along with a (100) orientation enabling layer, if the texture structure is functioning as a texture enabling structure. It is contemplated that any or all of the texture structures 606, 610, 614 may be present or omitted.

The (100) orientation enabling layer may comprise RuAl. As shown previously in Table II, textured RuAl with Cr over it provides an effective way to grow a (100) textured BCC ferromagnetic layer with high Bs and low Hc. Thus, in various embodiments, RuAl, acting as a (100) texture BCC seeding layer, is paired with Cr, acting as a high surface energy BCC seeding/buffer layer, on the RuAl. Besides RuAl, other (100) texture BCC enabling material options can include CrMo (e.g., Mo of 30-50 atomic percent). In some embodiments, chromium (Cr) heated at greater than 250 Celsius will grow it with a (100) orientation predominately. In one embodiment, RuAl that enables growth of (100) orientation Cr comprises aluminum (Al) at about 45 atomic percent, with ruthenium (Ru) at 55 atomic percent. In other embodiments, the content of Ru can have a range of 48-58 atomic percent. The (100) orientation enabling layer 406, and RuAl in particular, is an interfacial nucleation layer that lowers Hc regardless of the crystallographic orientation. In some embodiments, the Cr layer over the (100) orientation enabling layer may be omitted, or substituted by another seed/buffer layer with suitable materials (e.g., another high surface energy BCC layer) for the ferromagnetic layer that will grow on or over it. Example suitable materials are further described in connection with the high Rs layer 408 in FIGS. 4A-4G. The (100) orientation layers may in general be deposited on heated films/substrates.

Suitable materials for the amorphous layer include a metallic layer, a nitride layer, or an ionic layer that disrupts underlying crystal seeding effects. For the metallic layer, NiZr, NiTa, NiNb, NiTaFe, NiFeW, NiW, and combinations thereof can be used. For the nitride layer, NiZrN, NiTaN, NiNbN, NiTaFeN, NiFeWN, NiWN, and combinations thereof can be used. For the ionic layer, $Al_2O_3$, $SiO_2$, or other insulating material, and combinations therefore can be used.

Suitable materials for the texture transfer layer include higher Rs materials such as BCC metals such as Cr, Mo, V, W, or Ta; a B2 layer such as NiAl, IrAl, CoAl, RhAl, or RuAl; or a multilayer structure comprising a B2 layer, MgO, and another B2 layer.

Figure 7:
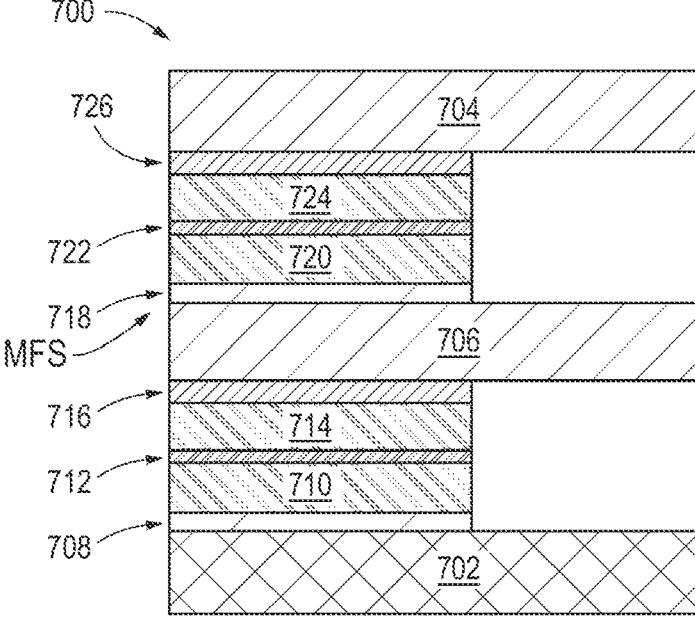

FIG. 7 illustrates a two dimensional magnetic recording (TDMR) head 700 that comprises a lower shield 702, an upper shield 704, and a middle shield 706. The head 700 includes a first texture structure 708 disposed over the lower shield 702, a first ferromagnetic layer 710 disposed over the first texture structure 708, a second texture structure 712 disposed over the first ferromagnetic layer 710, a second ferromagnetic layer 714 disposed over the second texture structure 712, a third texture structure 716 disposed over the second ferromagnetic layer 714, the middle shield 706 disposed over the third texture structure 716, a fourth texture structure 718 disposed over the middle shield 706, a third ferromagnetic layer 720 disposed over the fourth texture structure 718, a fifth texture structure 722 disposed over the third ferromagnetic layer 720, a fourth ferromagnetic layer 724 disposed over the fifth texture structure 722, a sixth texture structure 726 disposed over the fourth ferromagnetic layer 724, and the upper shield 704 disposed over the sixth texture structure 726. The lower shield 702, middle shield 706, and the upper shield 704 comprise CoFeX based materials.

The first texture structure 708 comprises an amorphous layer having materials as discussed above, a (100) orientation enabling layer having materials as described above, and an insulating layer in the case where the lower shield 702 is not textured (hence the first texture structure 708 is a texture enabling structure). Alternatively, the first texture structure comprises a texture transfer layer on an insulating layer when the lower shield 702 is textured (hence the first texture structure 708 is a texture transfer structure). If the first ferromagnetic layer 710 is not BCC CoFeX, then the insulating layer is optional.

The second texture structure 712 is used to form a textured second ferromagnetic layer 714. If functioning as a texture enabling structure (e.g., the first ferromagnetic layer 710 not already having a (100) orientation), the second texture structure 712 comprises an amorphous layer having materials as discussed above, a (100) orientation enabling layer having materials as described above, and an optional insulating layer to ensure the second ferromagnetic layer 714 is textured. Otherwise it comprises a texture transfer layer/structure. In various embodiments, the second texture structure 712 may comprise similar materials as the texture structure 610. One or more oxide layers may be disposed on the second texture transfer structure 712 for spin tunneling effect such as used in magnetic tunnel junctions.

If functioning as a texture enabling structure (e.g., the second ferromagnetic layer 714 not already having a (100) orientation), the third texture structure 716 comprises an amorphous layer having materials as discussed above, a (100) orientation enabling layer having materials as described above, an optional insulating layer to ensure the middle shield 706 is textured. Otherwise it comprises a texture transfer layer/structure. In various embodiments, the third texture structure 716 may comprise similar materials as the texture structure 614.

The fourth texture structure 718 comprises an amorphous layer having materials as discussed above, a (100) orientation enabling layer having materials as described above, and an insulating layer in the case where the middle shield 706 is not textured (hence the fourth texture structure 718 is a texture enabling structure). Alternatively, a texture transfer layer can be present on the insulating layer when the middle shield 706 is textured (hence the fourth texture structure 718 is a texture transfer structure). If the third ferromagnetic layer 720 is not BCC CoFeX, then the insulating layer is optional.

The fifth texture structure 722 is used to form a textured fourth ferromagnetic layer 724. If functioning as a texture enabling structure (e.g., the third ferromagnetic layer 720 not already having a (100) orientation), the fifth texture structure 722 comprises an amorphous layer having materials as discussed above, a (100) orientation enabling layer having materials as described above, and an optional insulating layer to ensure the fourth ferromagnetic layer 724 is textured. Otherwise it comprises a texture transfer layer/structure. In various embodiments, the fifth texture structure 722 may comprise similar materials as the texture structure 610. One or more oxide layers may be disposed on the fourth texture structure 722 for spin tunneling effect such as used in magnetic tunnel junctions.

If functioning as a texture enabling structure (e.g., the fourth ferromagnetic layer 724 not already having a (100) orientation), the sixth texture structure 726 comprises an amorphous layer having materials as discussed above, a (100) orientation enabling layer having materials as described above, and an optional insulating layer to ensure the upper shield 704 is textured. Otherwise it comprises a texture transfer layer/structure. In various embodiments, the sixth texture structure 726 may comprise similar materials as the texture structure 614.

In one embodiment, the first texture structure 708 is used to transfer texture to the first ferromagnetic layer 710 from a textured lower shield 702 or to create a texture for the first ferromagnetic layer 710 for a non-textured lower shield 702. Similarly, the second texture structure 712 is used to transfer texture to the second ferromagnetic layer 714. The third texture structure 716 is used to transfer texture to the middle shield 706. The fourth texture structure 718 is used to transfer texture to the third ferromagnetic layer 720 from a textured middle shield 706 or to create a texture for the third ferromagnetic layer 720 for a non-textured middle shield 706. The fifth texture structure 722 is used to transfer texture to the fourth ferromagnetic layer 724. Finally, the sixth texture structure 726 is used to transfer texture to the upper shield 704.

The (100) orientation enabling layer may comprise RuAl. As shown previously in Table II, textured RuAl with Cr over it provides an effective way to grow a (100) textured BCC ferromagnetic layer with high Bs and low Hc. Thus, in various embodiments, RuAl, acting as a (100) texture BCC seeding layer, is paired with Cr, acting as a high surface energy BCC seeding/buffer layer, on the RuAl. Besides RuAl, other (100) texture BCC enabling material options can include CrMo (e.g., Mo of 30-50 atomic percent). In some embodiments, chromium (Cr) heated at greater than 250 Celsius will grow it with a (100) orientation predominately. In one embodiment, RuAl that enables growth of (100) orientation Cr comprises aluminum (Al) at about 45 atomic percent, with ruthenium (Ru) at 55 atomic percent. In other embodiments, the content of Ru can have a range of 48-58 atomic percent. The (100) orientation enabling layer 406, and RuAl in particular, is an interfacial nucleation layer that lowers Hc regardless of the crystallographic orientation. In some embodiments, the Cr layer over the (100) orientation enabling layer may be omitted, or substituted by another seed/buffer layer with suitable materials (e.g., another high surface energy BCC layer) for the ferromagnetic layer that will grow on or over it. Example suitable materials are further described in connection with the high Rs layer 408 in FIGS. 4A-4G. The (100) orientation layers may in general be deposited on heated films/substrates.

Suitable materials for the amorphous layer include a metallic layer, a nitride layer, or an ionic layer that disrupts underlying crystal seeding effects. For the metallic layer, NiZr, NiTa, NiNb, NiTaFe, NiFeW, NiW, and combinations thereof can be used. For the nitride layer, NiZrN, NiTaN, NiNbN, NiTaFeN, NiFeWN, NiWN, and combinations thereof can be used. For the ionic layer, $Al_2O_3$, $SiO_2$, or other insulating material, and combinations therefore can be used.

Suitable materials for the texture transfer layer include higher Rs materials such as BCC metals such as Cr, Mo, V, W, or Ta; a B2 layer such as NiAl, IrAl, CoAl, RhAl, or RuAl; or a multilayer structure comprising a B2 layer, MgO, and another B2 layer.

The first, second, third, and fourth ferromagnetic layers 710, 714, 720, 724 may comprise any ferromagnetic material.

Figures 8A, 8B:
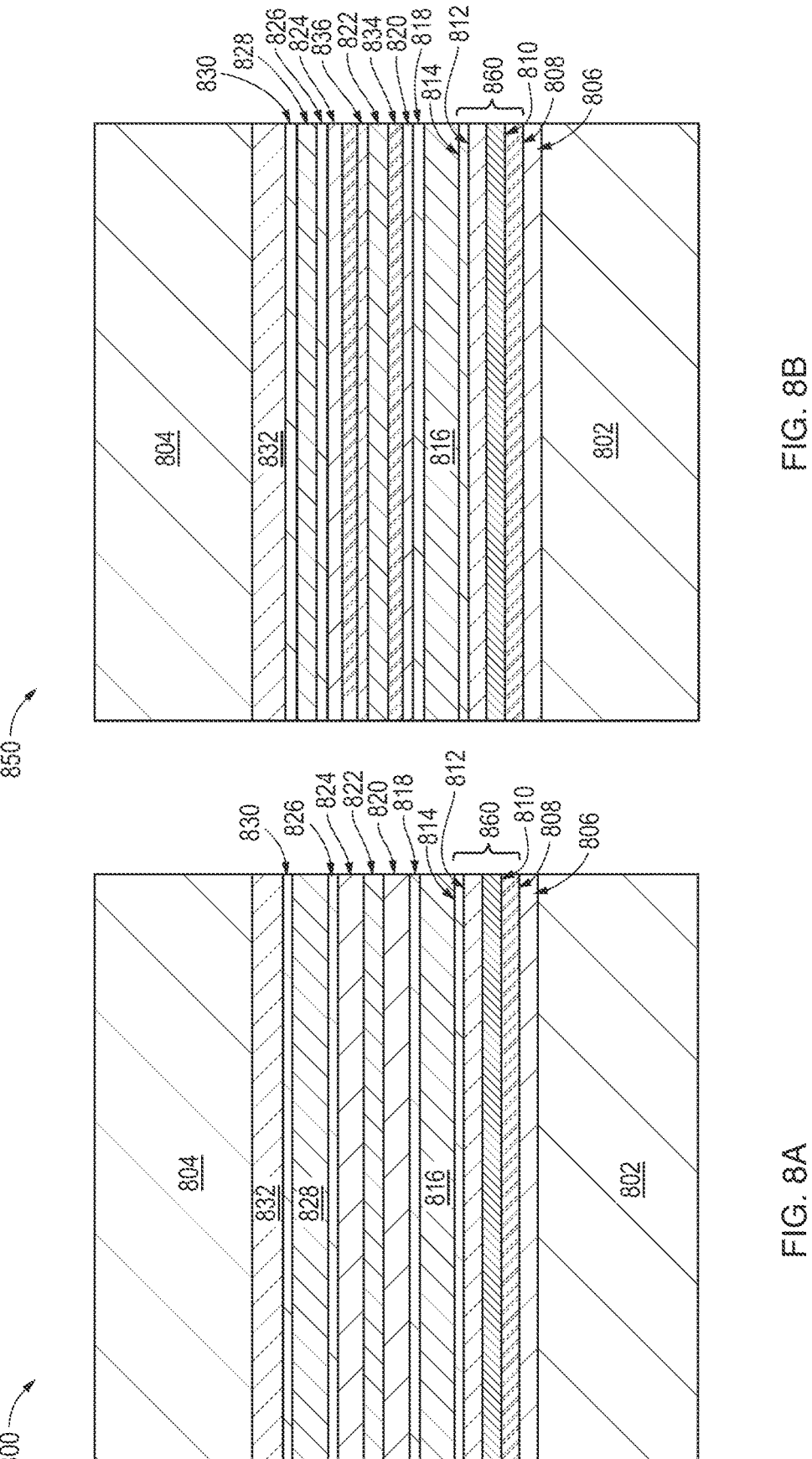

In FIGS. 8A and 8B, the read heads 800, 850 include a lower shield 802 and an upper shield 804 and are SOT differential read heads. Both the lower shield 802 and the upper shield 804 may comprise a magnetic material such as NiFe, NiFe/CoFe laminates, NiFe/NiFeCr laminates, or NiFe/W laminates, for example ("/" as used here denotes separate layers in a multi-layer stack). A first insulating layer 806 is disposed on the lower shield 802. Suitable materials for the first insulating layer 806 include SiOx, AlOx, MgO, MgTiO, as well as other insulating materials.

A texture transfer structure 860 comprising an amorphous layer 808, a (100) orientation enabling layer 810 formed thereon, a second insulating layer 812, and a texture transfer layer 814 are deposited over the first insulating layer 806. The amorphous layer 808 has a thickness of between about 18 Angstroms and about 25 Angstroms while the (100) orientation enabling layer 810 has a thickness of between about 18 Angstroms and about 25 Angstroms. The second insulating layer 812 is then deposited to a thickness of between about 10 Angstroms and about 20 Angstroms. The second insulating layer 812 comprises materials as discussed with regards to the first insulating layer 806. The texture transfer layer 814 is deposited on the second insulating layer 812. The texture transfer layer 814 has a thickness of between about 2 Angstroms and about 5 Angstroms and comprises materials as discussed above.

A first SOT layer 816 is then formed over the texture transfer layer 814. The first SOT layer 816 has a thickness of between about 80 Angstroms and about 100 Angstroms. Suitable materials for the first SOT layer 816 are as discussed above. Another texture transfer structure which comprises, more specifically, texture transfer layer 818, is then formed over the first SOT layer 816. The texture transfer layer 818 has a thickness of between about 2 Angstroms and about 5 Angstroms and comprises materials as discussed above.

A first free layer 820 is then formed over the texture transfer layer 818. An exemplary first free layer material is CoFe having a (100) orientation and a thickness of between about 30 Angstroms and about 100 Angstroms. A ground layer 822 is formed over the first free layer 820. Suitable materials for the ground layer 822 include a topological insulator material, such as BiSe, WTe, YPtBi, or BiSb. The ground layer 822 may comprise BiSb in a (012) orientation. The ground layer 822 may comprise undoped BiSb or doped BiSbX, where the dopant is less than about 10 at. %, and where X is extracted from elements which don't readily interact with Bi, such as B, N, Al, Si, Ti, V, Cr, Fe, Ni, Cu, Ge, Y, Zr, Ru, Mo, Ag, Hf, Ta, W, or Ir, or in alloy combinations with one or more of aforementioned elements, like CuAg, CuNi, RuGe, etc. More generally, some of the listed dopants may be used with other topological insulator materials other than BiSb. A second free layer 824 is then formed over the ground layer 822. An exemplary second free layer material is CoFe having a (100) orientation and a thickness of between about 30 Angstroms and about 100 Angstroms.

An insertion layer 826 is then formed over the second free layer 824. Exemplary materials for the insertion layer 826 include NiAl, a B2 layer or a BCC layer as discussed above. A second SOT layer 828 is then formed on the insertion layer 826. Suitable materials for the second SOT layer 828 are as discussed above and the second SOT layer 828 has a thickness of between about 80 Angstroms and about 100 Angstroms.

A texture transfer structure which comprises, more specifically, a texture transfer layer 830 formed over the second SOT layer 828 to transfer the texture to a later deposited layer. Exemplary materials for the texture transfer layer 830 are as discussed above and has a thickness of between about 2 Angstroms and about 5 Angstroms. A third insulating layer 832 is then disposed on the texture transfer layer 830. The third insulating layer 832 may comprise materials as discussed above and have a thickness of between about 18 Angstroms and about 25 Angstroms.

In the embodiment shown in FIG. 8B, the ground layer 822 is sandwiched between alloy migration inhibiting layers 834, 836. Exemplary materials for the alloy migration inhibiting layers 834, 836 include NiAl, IrAl, CoAl, RhAl, or RuAl having a (100) crystallographic orientation and a thickness of between about 2 Angstroms and about 5 Angstroms. The two alloy migration inhibiting layers 834, 836 need not be identical in composition or thickness.

The orientation induced by the strong texturing transfer structure produces a first SOT layer 816 with a (012) orientation. The texture transfer structure is useful for forming the first SOT layer 816 having a strong (012) orientation. The strong (012) orientation can be used in conjunction with a texture transfer layer to ensure a strong (100) orientation in FM materials. For example, a texture can be initially present, such as with the first SOT layer 816 having a (012) orientation, and use the (012) orientation is used to ensure a (012) orientation forms later in the second SOT layer 828 and thereafter a (100) orientation in the upper shield 804. The texture transfer layer 830 induces a low Rs, high moment, and low Hc ferromagnetic material to be formed (i.e., the upper shield 804).

Generally speaking for texture structures, if there is a desire for a low coercivity layer, the (100) orientation enabling layer will be present, and an amorphous layer may or may not be present directly below the (100) orientation enabling layer to reset the crystallographic orientation. An example of the (100) orientation enabling layer is RuAl. If there is a desire to ensure the correct texturing (i.e., (100)), then the texture transfer layer (e.g., NiAl) will be present.

Thus, when a low Hc layer having a specific orientation is desired, both a (100) orientation enabling layer and a texture transfer layer will be present. If only low Hc is desired regardless of orientation, the (100) orientation enabling layer will be present and the texture transfer layer may or may not be present. If the Hc is irrelevant, but a specific orientation is desired, then the texture transfer layer will be present, and the (100) orientation enabling layer may or may not be present. Ultimately, the texture structure is used to create the desired properties of low Hc and high Bs in shields or ferromagnetic layers formed thereover.

In one embodiment, a head for a magnetic storage device comprises: a ferromagnetic layer or a shield comprising a ferromagnetic material, wherein the ferromagnetic layer or ferromagnetic material has a low magnetic coercivity (Hc) of below 20 Oe and a high saturated magnetic flux (Bs); and one or more of: a texture enabling structure, wherein the texture enabling structure comprises: an amorphous layer for disrupting underlying crystal seeding effects; and a (100) orientation enabling layer disposed on the amorphous layer; and a texture transfer layer configured to transfer a (100) orientation to a layer disposed thereon, wherein the ferromagnetic layer or the shield is over the one or more of the texture enabling structure and the texture transfer layer. The head comprises both the texture enabling structure and the texture transfer layer. The amorphous layer comprises a metallic layer, a nitride layer, or an ionic layer. The metallic layer is selected from the group consisting of NiZr, NiTa, NiNb, NiTaFe, NiFeW, NiW, and combinations thereof. The nitride layer is selected from the group consisting of NiZrN, NiTaN, NiNbN, NiTaFeN, NiFeWN, NiWN, and combinations thereof. The ionic layer is selected from the group consisting of $Al_2O_3$, $SiO_2$, and combinations thereof. The (100) orientation enabling layer comprises RuAl or CrMo, and the head further comprises a layer comprising Cr over the (100) orientation enabling layer. The texture transfer layer comprises a material selected from the group consisting of NiAl, IrAl, CoAl, RhAl, RuAl, and combinations thereof. A magnetic recording device comprising the head is also contemplated.

In another embodiment, a magnetic write head comprises: a main pole; a trailing shield; a leading shield; a side shield; and one or more texture enabling structures, wherein one or more of the main pole, the trailing shield, the leading shield, and the side shield is disposed on a corresponding texture enabling structure, wherein the texture enabling structure includes a (100) orientation enabling layer disposed on an amorphous layer, the (100) orientation enabling layer comprising RuAl or CrMo. The main pole, the trailing shield, the leading shield, or the side shield that is disposed on a corresponding texture enabling structure has a (100) orientation. The main pole is disposed on a texture enabling structure, and wherein a texture transfer layer is disposed over the main pole. The magnetic write head further comprises an additional texture enabling structure between the main pole and the trailing shield, wherein the trailing shield is disposed on a texture transfer structure, and wherein the texture transfer structure includes: BCC metals; NiAl, IrAl, CoAl, RhAl, or RuAl; or a multilayer structure including: a first layer comprising NiAl, IrAl, CoAl, RhAl, or RuAl; a second layer comprising MgO; and a third layer comprising NiAl, IrAl, CoAl, RhAl, or RuAl. A magnetic recording device comprising the head is also contemplated.

In another embodiment, a magnetic write head comprises: a main pole; a trailing shield; a spin orbit torque (SOT) layer disposed between the main pole and the trailing shield; a texture enabling structure disposed between the main pole and the SOT layer, wherein the spin orbit torque (SOT) layer is disposed on the texture enabling structure; and a texture transfer structure disposed between the SOT layer and the trailing shield. The trailing shield has a (100) orientation. The (100) orientation extends from an interface with the texture transfer structure in a direction away therefrom for a distance of up to about 0.2 μm. The texture transfer structure comprises NiAl, IrAl, CoAl, RhAl, or RuAl. The texture transfer structure is a multilayer structure comprising an insulating layer sandwiched between layers of NiAl, IrAl, CoAl, RhAl, or RuAl. A magnetic recording device comprising the magnetic write head is also contemplated.

In another embodiment, a magnetic read head comprises: a lower shield; an upper shield; a ferromagnetic layer disposed between the lower shield and the upper shield; and at least one texture transfer structure, wherein one or more of the ferromagnetic layer and the upper shield is disposed on a corresponding texture transfer structure, wherein the texture transfer structure includes: BCC metals; NiAl, IrAl, CoAl, RhAl, or RuAl; or a multilayer structure including: a trilayer structure comprising: a first layer comprising NiAl, IrAl, CoAl, RhAl, or RuAl; a second layer comprising MgO; and a third layer comprising NiAl, IrAl, CoAl, RhAl, or RuAl; or a bilayer structure comprising: a first layer comprising NiAl; and a second layer comprising RuAl. The magnetic read head further comprises a spin orbit torque (SOT) layer, wherein the SOT layer is disposed on a corresponding texture transfer structure. The SOT layer is disposed between the ferromagnetic layer and the lower shield. At least one of the lower shield and the upper shield comprises CoFe with a (100) orientation. The magnetic read head further comprises a texture enabling structure disposed on the lower shield. The texture enabling structure comprises: an amorphous layer for disrupting underlying crystal seeding effects; and a (100) orientation enabling layer disposed on the amorphous layer. The (100) orientation enabling layer comprises RuAl. A magnetic recording device comprising the magnetic read head is also contemplated.

In another embodiment, a magnetic read head comprises: a lower shield; an upper shield; a first ferromagnetic layer disposed between the lower shield and the upper shield; a second ferromagnetic layer disposed between the first ferromagnetic layer and the upper shield; and at least one texture structure, wherein one or more of the first ferromagnetic layer, the second ferromagnetic layer, and the upper shield is disposed on a corresponding texture structure, wherein the at least one texture structure includes: a texture enabling structure; or a texture transfer structure; or both a texture enabling structure and a texture transfer structure. The first ferromagnetic layer is disposed on a texture transfer structure. The second ferromagnetic layer is disposed on a texture transfer structure. The upper shield is disposed on a texture transfer structure. The first ferromagnetic layer is disposed on a texture enabling structure. The read head comprises the texture enabling structure and the texture enabling structure comprises an amorphous layer, a (100) orientation enabling layer, and a higher sheet resistance (Rs) layer. The amorphous layer comprises a metallic layer, a nitride layer, or an ionic layer that disrupts underlying crystal seeding effects. The (100) orientation enabling layer is selected from the group consisting of: RuAl, and CrMo. The higher Rs layer is selected from the group consisting of: BCC metals, a B2 layer, or a multilayer structure comprising a B2 layer, MgO, and another B2 layer. The BCC metals are selected from the group consisting of: Cr, Mo, V, W, and Ta. The B2 layer is selected from the group consisting of: as NiAl, IrAl, CoAl, RhAl, and RuAl. The magnetic read head further comprises: a middle shield, wherein the middle shield is disposed between the second ferromagnetic layer and the upper shield; a third ferromagnetic layer, wherein the third ferromagnetic layer is disposed between the middle shield and the upper shield; and a fourth ferromagnetic layer, wherein the fourth ferromagnetic layer is disposed between the third ferromagnetic layer and the upper shield. One or more of the first ferromagnetic layer, the second ferromagnetic layer, the third ferromagnetic layer, the fourth ferromagnetic layer, the middle shield, and the upper shield is disposed on a corresponding texture transfer structure. A magnetic recording device comprising the magnetic read head is also contemplated.

In another embodiment, a magnetic read head comprises: a lower shield; an upper shield; a first texture transfer structure; a first spin orbit torque (SOT) layer disposed on the first texture transfer structure; and a second SOT layer disposed between the first SOT layer and the upper shield. The upper shield comprises a laminate comprising NiFe. The texture transfer structure comprises an amorphous layer and a (100) orientation enabling layer. The first SOT layer has a (012) orientation. The magnetic read head further comprises: a texture transfer layer disposed on the first SOT layer; and a free magnetic layer disposed on the texture transfer layer, wherein the free magnetic layer has a (100) orientation. A magnetic recording device comprising the magnetic read head is also contemplated.

While the foregoing is directed to embodiments of the present disclosure, other and further embodiments of the disclosure may be devised without departing from the basic scope thereof, and the scope thereof is determined by the claims that follow.

What is claimed is:

1. A head for a magnetic storage device, comprising:
a ferromagnetic layer or a shield comprising a ferromagnetic material, wherein the ferromagnetic layer or ferromagnetic material has a low magnetic coercivity (Hc) of below 20 Oe and a high saturated magnetic flux (Bs);
a texture enabling structure, wherein the texture enabling structure comprises:
an amorphous layer for disrupting underlying crystal seeding effects; and
a (100) orientation enabling layer disposed on the amorphous layer; and
a texture transfer layer configured to transfer a (100) orientation to a layer disposed thereon, wherein the ferromagnetic layer or the shield is over the texture enabling structure and the texture transfer layer, and wherein the ferromagnetic layer or the shield is disposed in contact with the texture transfer layer.

2. The head of claim 1, wherein the amorphous layer comprises a metallic layer, a nitride layer, or an ionic layer.

3. The head of claim 2, wherein the metallic layer is selected from the group consisting of NiZr, NiTa, NiNb, NiTaFe, NiFeW, NiW, and combinations thereof.

4. The head of claim 2, wherein the nitride layer is selected from the group consisting of NiZrN, NiTaN, NiNbN, NiTaFeN, NiFeWN, NiWN, and combinations thereof.

5. The head of claim 2, wherein the ionic layer is selected from the group consisting of $Al_2O_3$, $SiO_2$, and combinations thereof.

6. The head of claim 1, wherein the (100) orientation enabling layer comprises RuAl or CrMo, and the head further comprises a layer comprising Cr over the (100) orientation enabling layer.

7. The head of claim 1, wherein the texture transfer layer comprises a material selected from the group consisting of NiAl, IrAl, CoAl, RhAl, RuAl, and combinations thereof.

8. A magnetic recording device comprising the head of claim 1.

9. A magnetic write head, comprising:
a main pole;
a trailing shield;
a leading shield;
a side shield; and
one or more texture enabling structures, wherein one or more of the main pole, the trailing shield, the leading shield, and the side shield is disposed on a corresponding texture enabling structure, wherein the texture enabling structure includes a (100) orientation enabling layer disposed on an amorphous layer, the (100) orientation enabling layer comprising RuAl or CrMo, and wherein the main pole, the trailing shield, the leading shield, or the side shield that is disposed on a corresponding texture enabling structure has a (100) orientation.

10. The magnetic write head of claim 9, wherein the amorphous layer comprises a metallic layer, a nitride layer, or an ionic layer.

11. The magnetic write head of claim 10, wherein the nitride layer is selected from the group consisting of NiZrN, NiTaN, NiNbN, NiTaFeN, NiFeWN, NiWN, and combinations thereof.

12. The magnetic write head of claim 9, wherein the main pole is disposed on a texture enabling structure, and wherein a texture transfer layer is disposed over the main pole.

13. The magnetic write head of claim 12, further comprising an additional texture enabling structure between the main pole and the trailing shield, wherein the trailing shield is disposed on a texture transfer structure, and wherein the texture transfer structure includes:
BCC metals;
NiAl, IrAl, CoAl, RhAl, or RuAl; or
a multilayer structure including:
a first layer comprising NiAl, IrAl, CoAl, RhAl, or RuAl;
a second layer comprising MgO; and
a third layer comprising NiAl, IrAl, CoAl, RhAl, or RuAl.

14. A magnetic recording device comprising the head of claim 9.

15. A magnetic write head, comprising:
a main pole;
a trailing shield;
a spin orbit torque (SOT) layer disposed between the main pole and the trailing shield;
a texture enabling structure disposed between the main pole and the SOT layer, wherein the spin orbit torque (SOT) layer is disposed on the texture enabling structure; and
a texture transfer structure disposed between the SOT layer and the trailing shield, wherein the texture transfer structure comprises NiAl, IrAl, CoAl, RhAl, or RuAl, or wherein the texture transfer structure is a multilayer structure comprising an insulating layer sandwiched between layers of NiAl, IrAl, CoAl, RhAl, or RuAl.

16. The magnetic write head of claim 15, wherein the trailing shield has a (100) orientation.

17. The magnetic write head of claim 16, wherein the (100) orientation extends from an interface with the texture transfer structure in a direction away therefrom for a distance of up to about 0.2 μm.

18. The magnetic write head of claim 15, wherein the texture transfer structure comprises NiAl, IrAl, CoAl, RhAl, or RuAl.

19. The magnetic write head of claim 15, wherein the texture transfer structure is a multilayer structure comprising an insulating layer sandwiched between layers of NiAl, IrAl, CoAl, RhAl, or RuAl.

20. A magnetic recording device comprising the magnetic write head of claim 15.

* * * * *